United States Patent
Roy et al.

(10) Patent No.: US 11,727,057 B2
(45) Date of Patent: Aug. 15, 2023

(54) NETWORK KEY VALUE INDEXING DESIGN

(71) Applicant: SAMSUNG ELECTRONICS CO., LTD., Suwon-si (KR)

(72) Inventors: Somnath Roy, San Jose, CA (US); Ronald Lee, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 559 days.

(21) Appl. No.: 16/820,356

(22) Filed: Mar. 16, 2020

(65) Prior Publication Data

US 2021/0067332 A1 Mar. 4, 2021

Related U.S. Application Data

(60) Provisional application No. 62/895,948, filed on Sep. 4, 2019.

(51) Int. Cl.
| | |
|---|---|
| G06F 16/00 | (2019.01) |
| G06F 16/901 | (2019.01) |
| H04L 9/08 | (2006.01) |
| G06F 16/13 | (2019.01) |
| G06F 9/30 | (2018.01) |
| G06F 16/903 | (2019.01) |
| G06F 8/41 | (2018.01) |

(52) U.S. Cl.
CPC ...... *G06F 16/9014* (2019.01); *G06F 9/30185* (2013.01); *G06F 16/134* (2019.01); *G06F 16/90344* (2019.01); *H04L 9/0825* (2013.01); *H04L 9/0861* (2013.01); *G06F 8/427* (2013.01); *G06F 2207/025* (2013.01)

(58) Field of Classification Search
CPC .. G06F 16/134; G06F 16/2255; G06F 16/242; G06F 16/289; G06F 16/9014; G06F 16/90344; G06F 9/30185; G06F 9/44552; G06F 8/427; G06F 40/205; G06F 2207/025; H04L 9/0825; H04L 9/0861; H04L 61/4552; H04L 2101/35
See application file for complete search history.

(56) References Cited

U.S. PATENT DOCUMENTS

| | | | |
|---|---|---|---|
| 5,918,225 | A | 6/1999 | White et al. |
| 6,128,627 | A | 10/2000 | Mattis et al. |
| 7,539,771 | B2 | 5/2009 | De Castro et al. |

(Continued)

OTHER PUBLICATIONS

Amazon Simple Storage Service, API Reference, API Version Mar. 1, 2006, AWS, https://docs.aws.amazon.com/AmazonS3/latest/APS/API_ListObjects.html, 1,542 pages.

*Primary Examiner* — Diedra McQuitery
(74) *Attorney, Agent, or Firm* — Lewis Roca Rothgerber Christie LLP

(57) ABSTRACT

Provided is a method of indexing in a network key value indexing system. The method includes retrieving a first key name from a storage device of the network key value indexing system, the first key name identifying a first prefix, a first bucket, and a first key, the first prefix indicating the first bucket, parsing the first key name into the first prefix, the first bucket, and the first key, determining the first prefix, the first bucket, and the first key based on a first delimiter, and generating a hash table in a memory cache of the network key value indexing system to associate the first prefix with the first key.

20 Claims, 6 Drawing Sheets

(56) References Cited

U.S. PATENT DOCUMENTS

| | | | |
|---|---|---|---|
| 8,392,400 B1* | 3/2013 | Ransil | G06F 11/3433 |
| | | | 707/719 |
| 8,433,695 B2 | 4/2013 | Wu et al. | |
| 8,972,453 B2 | 3/2015 | Wu et al. | |
| 9,172,743 B2 | 10/2015 | Shi et al. | |
| 9,455,996 B2 | 9/2016 | Chao et al. | |
| 10,838,940 B1* | 11/2020 | Wu | G06F 16/2237 |
| 2007/0239716 A1* | 10/2007 | Weininger | G06F 16/9535 |
| 2013/0282854 A1 | 10/2013 | Jang et al. | |
| 2013/0339000 A1* | 12/2013 | Zhang | G06F 40/284 |
| | | | 704/9 |
| 2014/0310476 A1* | 10/2014 | Kruus | G06F 12/0871 |
| | | | 711/133 |
| 2016/0103858 A1* | 4/2016 | Katz | G06F 16/9027 |
| | | | 707/797 |
| 2016/0283538 A1 | 9/2016 | Barber et al. | |
| 2019/0065545 A1* | 2/2019 | Hazel | G06F 16/2455 |
| 2020/0045010 A1* | 2/2020 | Sun | H04L 67/1065 |

* cited by examiner

NETWORK KEY VALUE INDEXING DESIGN

CROSS-REFERENCE TO RELATED APPLICATION(S)

This application claim priority to, and the benefit of, U.S. Provisional Application Ser. No. 62/895,948, filed Sep. 4, 2019, entitled "EFFICIENT KEY LIST SCHEME FOR NETWORK K/V SYSTEM," the content of which being incorporated herein by reference in its entirety.

FIELD

One or more aspects of embodiments of the present disclosure relate generally to a Network Key Value ("NKV") indexing design for key-value solid state drives ("KV-SSDs").

BACKGROUND

An associative array may be implemented to hold data in key-value pairs. Some associative arrays employ an indexing system that uses a hash table to map keys to values, thereby forming the key-value pairs. Associative arrays generally support storing, modifying, removing, and looking up data using the key-value pairs.

SUMMARY

Aspects of embodiments of the present disclosure are directed toward a system and method that uses an NKV indexing design to build a hierarchical data structure from a flat key name.

Aspects of embodiments of the present disclosure are directed toward a system and method that builds a crash tolerant hierarchical data structure in volatile memory, thereby avoiding any extra metadata overhead associated with implementing an indexing design in persistent memory (e.g., as a result of metadata that would not otherwise be present for key-value storage when no indexing design is implemented). For example, a persistent NKV indexing design may require additional information in metadata that would impact IO performance.

According to one embodiment of the present disclosure, there is provided a method of indexing in a network key value indexing system, the method including retrieving a first key name from a storage device of the network key value indexing system, the first key name identifying a first prefix, a first bucket, and a first key, the first prefix indicating the first bucket, parsing the first key name into the first prefix, the first bucket, and the first key, determining the first prefix, the first bucket, and the first key based on a first delimiter, and generating a hash table in a memory cache of the network key value indexing system to associate the first prefix with the first key The method may further include retrieving a second key name from the storage device, the second key name identifying the first prefix, the first bucket, a second prefix, a second bucket, and a second key, the second prefix indicating the first bucket and the second bucket, parsing the second key name into the first prefix, the first bucket, a second prefix, a second bucket, and a second key, and determining the second prefix, the second bucket, and the second key based on the first delimiter and a second delimiter, where generating the hash table in the memory cache includes associating the second prefix with the second key.

The method may further include retrieving a third key name from the storage device, the third key name identifying the first prefix, the first bucket, and a third key, parsing the third key name into the first prefix, the first bucket, and a third key, and determining the third key based on a third delimiter, where generating the hash table in the memory cache includes associating the first prefix with the third key.

The memory cache may be volatile memory.

The method may further include listing the first prefix with a listing performance of O(N) where N is a number of keys and buckets associated with the first prefix.

The method may further include repeating the retrieving, the parsing, the determining, and the generating during a startup of the network key value indexing system in response to a system crash or power-cycle.

The storage device may include a plurality of storage device buckets and the retrieving the first key name from the storage device may further include applying an iterator to a single storage device bucket from among the plurality of storage device buckets based on an iterator prefix, and retrieving the first key name iterated by the iterator from the single storage device bucket.

According to another embodiment of the present disclosure, there is provided a non-transitory computer readable medium implemented on a system for indexing, the non-transitory computer readable medium having computer code that, when executed on a processor, implements a method of indexing, the method including retrieving a first key name from a storage device, parsing the first key name including a first prefix, a first bucket, and a first key, the first prefix indicating the first bucket, determining the first prefix, the first bucket, and the first key based on a first delimiter, and generating a hash table in a memory cache by associating the first prefix with the first key.

The computer code, when executed by the processor, may further implement the method of indexing by retrieving a second key name from the storage device, the second key name identifying the first prefix, the first bucket, a second prefix, a second bucket, and a second key, the second prefix indicating the first bucket and the second bucket, parsing the second key name into the first prefix, the first bucket, a second prefix, a second bucket, and a second key, and determining the second prefix, the second bucket, and the second key based on the first delimiter and a second delimiter, where generating the hash table in the memory cache includes associating the second prefix with the second key.

The computer code, when executed by the processor, may further implement the method of indexing by retrieving a third key name from the storage device, the third key name identifying the first prefix, the first bucket, and a third key, parsing the third key name into the first prefix, the first bucket, and a third key, and determining the third key based on a third delimiter, where generating the hash table in the memory cache includes associating the first prefix with the third key.

The memory cache may be volatile memory.

The computer code, when executed by the processor, may further implement the method of indexing by listing the first prefix with a listing performance of O(N) where N is a number of keys and buckets associated with the first prefix.

The computer code, when executed by the processor, may further implement the method of indexing by repeating the retrieving, the parsing, the determining, and the generating in response to a system crash or power-cycle.

The storage device may include a plurality of storage device buckets, and the computer code, when executed by the processor, may further implement the retrieving the first key name from the storage device by applying an iterator to a single storage device bucket from among the plurality of storage device buckets based on an iterator prefix, and retrieving the first key name iterated by the iterator from the single storage device bucket.

According to yet another embodiment of the present disclosure, there is provided a system for indexing, the system including a storage device, a processing circuit, and a memory cache, where the processing circuit is configured to retrieve a first key name from the storage device, parse the first key name including a first prefix, a first bucket, and a first key, the first prefix indicating the first bucket, determine the first prefix, the first bucket, and the first key based on a first delimiter, and generate a hash table in the memory cache by associating the first prefix with the first key.

The processing circuit may be further configured to retrieve a second key name from the storage device, the second key name identifying the first prefix, the first bucket, a second prefix, a second bucket, and a second key, the second prefix indicating the first bucket and the second bucket, parse the second key name into the first prefix, the first bucket, a second prefix, a second bucket, and a second key, and determine the second prefix, the second bucket, and the second key based on the first delimiter and a second delimiter, where the processing circuit is configured to generate the hash table in the memory cache by associating the second prefix with the second key.

The processing circuit may be further configured to retrieve a third key name from the storage device, the third key name identifying the first prefix, the first bucket, and a third key, parse the third key name into the first prefix, the first bucket, and a third key, and determine the third key based on a third delimiter, where the processing circuit is configured to generate the hash table in the memory cache by associating the first prefix with the third key.

The memory cache may be volatile memory.

The processing circuit may be further configured to list the first prefix with a listing performance of O(N) where N is a number of keys and buckets associated with the first prefix.

The processing circuit may be further configured to repeat retrieving the first key name, parsing the first key name, determining the first prefix, the first bucket, and the first key, and generating the hash table in response to a system crash or power-cycle.

Accordingly, the system and method of embodiments of the present disclosure may build a hash table with a hierarchical data structure in volatile memory that is crash tolerant using an NKV indexing design.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1A:
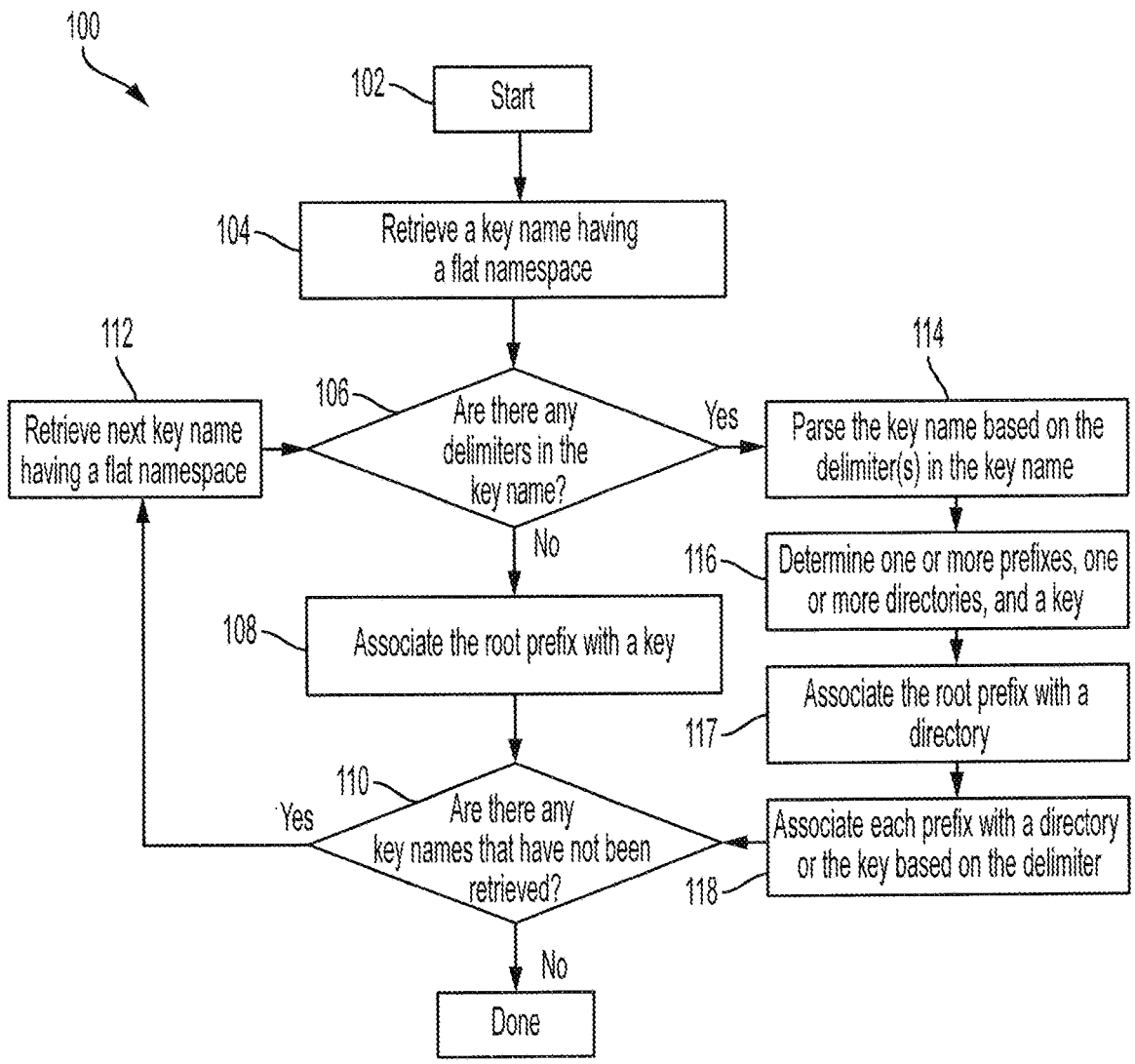
FIG. 1A is a flow chart illustrating a method of building a hash table based on an NKV indexing design according to one or more embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system).

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Keys may be associated with corresponding values as part of a key-value pairing, however, the keys themselves might not be sorted. Therefore, an entire listing of keys may need to be searched to return a value associated with a particular key. Further, attempts to introduce a sorting scheme may interfere with the performance of input/output ("IO") operations. For example, a sorting scheme that writes additional metadata for supporting aspects of the sorting scheme may reduce IO performance.

As disclosed herein, an in-memory hash table may be introduced that organizes keys into a hierarchical data structure. The hierarchical data structure may include a plurality of levels forming a hierarchy. Each level may contain keys and/or buckets that indicate another level (e.g., a lower level) that contains one or more additional keys. In this manner, keys are sorted into levels of the hierarchical data structure. By performing a non-recursive search of a particular level, a portion of the entire listing of keys may be searched as opposed to the entire listing. Accordingly, sorted functionality is provided.

Further, the in-memory hash table may be built and rebuilt upon startup of a storage device without introducing metadata for persistency to key-value pairs on the storage device. Therefore, the hash table is able to be crash-tolerant without impacting IO performance.

Figure 1B:
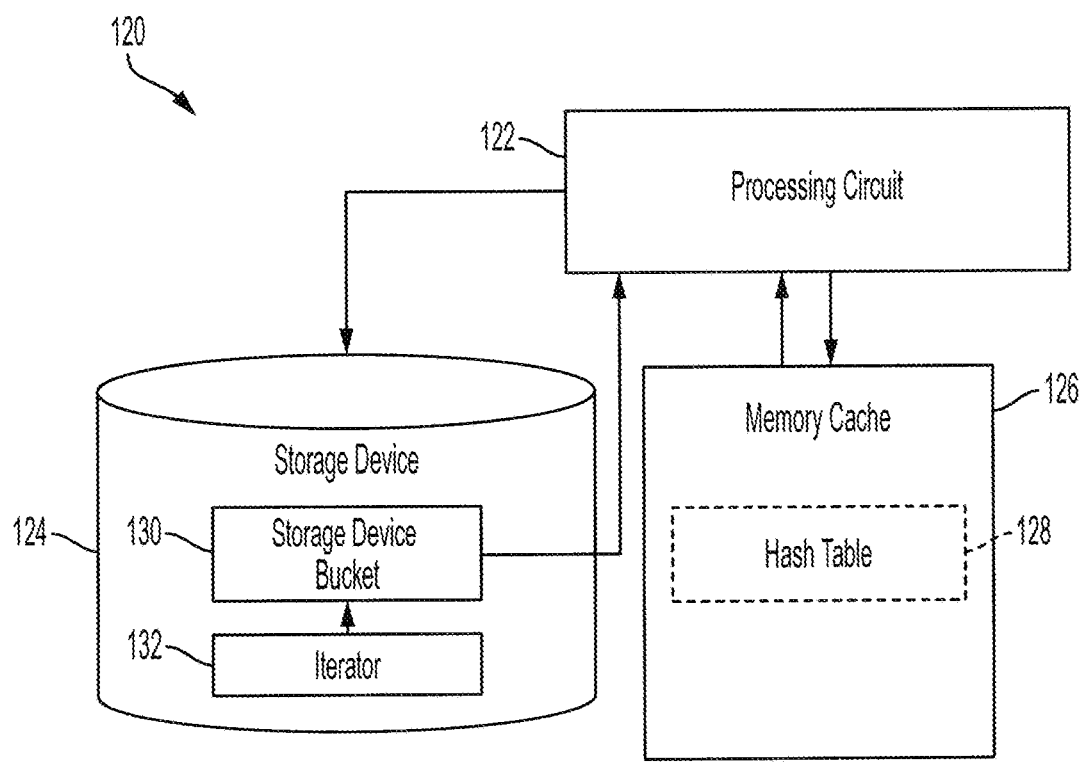
FIG. 1B depicts a system for building the hash table of FIG. 1A according to one or more embodiments of the present disclosure.

FIG. 1A is a flow chart illustrating a method (100) of building a hash table based on an NKV indexing design according to one or more embodiments of the present disclosure. FIG. 1B depicts a system 120 for building the hash table 128 according to one or more embodiments of the present disclosure.

Referring to FIGS. 1A-1B, the method (100) may include building a hash table 128 in a memory cache 126 using a system 120 including a processing circuit (e.g., a general computer processor) 122, a storage device 124, and the memory cache 126.

The storage device 124 may store keys and values in persistent memory. The keys stored in persistent memory in the storage device 124 might not be sorted, and may have a non-hierarchical data structure. In one or more embodiments, due to the nature of the storage device 124, the storage device 124 might be unable to form a hierarchical data structure.

The memory cache 126 may include any suitable memory cache for building a hash table 128, such as a dynamic random access memory (DRAM) cache, a static random access memory (SRAM) cache, etc. The memory cache 126 may be volatile memory (i.e., the memory cache 126 may lose data when power is lost).

The processing circuit 122 may instruct the storage device 124 to run a software module (e.g., a Key Value Application) that calls a function (e.g., a library initialization function, such as "nkv_open( )"). The function may cause the storage device 124 to use an iterator 132 (e.g., a KV-SSD iterator) to identify and iterate through keys that are stored in the storage device 124 to transmit key names to the memory cache 126.

As used herein, the terms "key" and "key name" can both refer to a key that is associated with an object in a storage device, such as a key-value solid state drive (KV-SSD). However, for the purpose of describing a hash table built in a memory cache that is separate from the storage device, the term "key name" can refer to the key of the storage device, while the term "key" can refer to a parsed portion of the "key name." Despite this distinction, both the "key" and the "key name" may be treated as the key of the storage device.

In one or more embodiments, the storage device 124 includes a plurality of storage device buckets (e.g., 255 storage device buckets), and the iterator 132 iterates through a single storage device bucket 130 from among a plurality of storage device buckets in the storage device 124 (e.g., from among 255 storage device buckets). The iterator 132 may identify the storage device bucket 130 for iteration based on an iterator 132 prefix (e.g., a 4-byte prefix, such as "meta/"). The iterator 132 may transmit keys from the storage device bucket 130 in the storage device 124 to the processing circuit 122. The processing circuit 122 may build the hash table 128 in the memory cache 126 using the keys received (or retrieved) from the storage device 124.

In one or more embodiments, key names having the prefix of "meta/" are stored in the storage device bucket 130. Therefore, keys that would benefit from the NKV indexing design (e.g., keys having key names indicating a hierarchical data structure as described in more detail below) may be stored in the storage device bucket 130 by the storage device 124, while keys that would not benefit from the NKV indexing design (e.g., keys having key names that do not indicate a hierarchical data structure) may be stored in another one of the plurality of storage device buckets. Accordingly, the iterator 132 may use the iterator prefix to only iterate over relevant keys for building the hash table during initialization, and thus, an amount of time to build the hash table may be reduced.

Although FIG. 1B illustrates the iterator 132 as iterating through a single storage device bucket 130 of the storage device 124, it should be noted that the iterator 132 may iterate through more than one storage device bucket (e.g., may iterate through all 255 buckets of the storage device 124), such as when the time taken to build a hash table is not a concern.

In one or more embodiments, the processing circuit 122 may provide instructions to the memory cache 126 for building the hash table 128 in the memory cache 126. The method (100) shown in FIG. 1A may include building the hash table 128 in the memory cache 126 by retrieving a key name (104). The key name may have a flat name space (e.g., a namespace lacking a hierarchical data structure).

The processing circuit 122 may determine whether there are any delimiters in the retrieved key name (106). A delimiter may be any string, character, number, symbol, and the like, that the software module is able to identify as a delimiter. For example, in one or more embodiments, a delimiter may be indicated by a forward slash "/" in the key name.

In one or more embodiments, when there are no delimiters in the key name, the processing circuit 122 may associate a root prefix with a key of the key name (108). For example, an entry may be added to the hash table 128 when the hash function of the root prefix returns the key. Therefore, the key may be stored at a first level (or root level) according to a hierarchical data structure (e.g., a multi-level data structure).

As used herein, the term "bucket" can refer to a data buffer in which data is divided into regions of the data buffer, However, for the purpose of describing a hash table built in a memory cache that is separate from the storage device, the term "bucket" can refer to a part of a "key name" that identifies which bucket stores the data (i.e., a part of the "key name" that identifies where to find the data).

If there are delimiters in the key name, then the processing circuit 122 may parse the key name based on each of the delimiters in the key name (114). The processing circuit 122 may then determine one or more prefixes, one or more buckets, and a key in the parsed key name (116). For example, each parsed portion of the key name may be identified as corresponding to a bucket or a key. Each key name may include a single key, which may be the parsed content (e.g., a string), and which may be located to the right of the rightmost delimiter. Also, each key name may indicate one or more buckets, which may be separated by one or more respective delimiters, and which may be located to the left of a respective delimiter.

It should be noted that, although terms such as "left," "right," "opposite," and "between" are used herein, these terms are used for ease of description to describe one element or feature's relationship to another element(s) or feature(s). It will be understood that other suitable arrangements or schemes may be used to distinguish prefixes, delimiters, buckets, and/or keys that support the same NKV indexing design. For example, the key names may be reversed with spatially relative terms being reversed throughout the description according to one or more embodiments of the present disclosure.

A prefix may include all content of a corresponding key name to the left of a delimiter regardless of whether another delimiter is present. A prefix may be determined by concatenating multiple buckets and/or delimiters. Therefore, a prefix may indicate one or more buckets and/or may include one or more delimiters. In one or more embodiments, the prefix does not indicate a key. Because the processing circuit 122 determines a prefix for each delimiter, the number of prefixes determined from a key name, excluding the root prefix, may equal the number of delimiters in the key name.

The processing circuit 122 may further associate the root prefix with a bucket determined based on the delimiter. For example, the processing circuit 122 may associate the root prefix with a first bucket to the left of a first delimiter when the key name is scanned from left to right. In other words, the root prefix may be associated with the leftmost bucket. The root prefix may be associated with a bucket by adding an entry to the hash table 128 when the hash function of the root prefix returns the associated bucket.

The processing circuit 122 may also associate each prefix of the key name with a bucket or key based on the delimiter (118). For example, each prefix is associated with an adjacent bucket or an adjacent key that is located on an opposite side of the delimiter (e.g., each prefix may be associated with a bucket or key that is immediately to the right of the delimiter that is to the right of the prefix). In other words, the prefix is associated with the first bucket or key following the delimiter when the key name is scanned from left to right. Additional buckets and/or the key following a first bucket are not directly associated with the prefix.

In one or more embodiments, association of a prefix with a bucket or key is formed by adding an entry to the hash table 128 where the hash function of the prefix returns the associated bucket or associated key. Therefore, a key name may result in multiple entries being added to the hash table 128, as a single key name may include multiple prefixes associated with either a bucket or the key.

In one or more embodiments, the storage device 124 uses the iterator 132 to determine whether there are any remaining key names that have not been retrieved for (110) or transmitted to the processing circuit 122. If there are any key names that have not been retrieved for or transmitted to the processing circuit 122, then the storage device 124 may use the iterator 132 to retrieve and transmit a subsequent key name having a flat namespace (112) to the processing circuit 122.

Accordingly, operations 106, 108, and 110 may be repeated, or operations 106, 114, 116, 117, 118, and 110 may be repeated, until all of the key names in the storage device bucket(s) 130 of the storage device 124 are used to generate the hash table 128 according to the NKV indexing design. With respect to operations 117 and 118, redundant entries may not be added to the hash table 128. For example, when a prefix is already associated with a bucket or key based on another key name, then no additional action is taken for that prefix with respect to the hash table 128.

According to the method of one or more embodiments described above, a hash table 128 is built or generated where key names are parsed into a hierarchical data structure based on an NKV indexing design, wherein the root level is a highest level that is followed by lower level buckets including one or more keys. With respect to each key name, the root level is the highest level, and the key is the lowest level, while one or more buckets may be at one or more consecutive levels between the root level and the key level. Therefore, a hierarchical data structure is formed according to the NKV indexing design from key names having a flat namespace. Accordingly, the NKV indexing design may support the generation of an improved hash table 128 for storing keys under a prefix.

According to the above, the hash table 128 based on the NKV indexing design is system crash tolerant, because the hash table 128 can be rebuilt or regenerated based on key names upon system startup or after a power-cycle. Therefore, the hash table 128 may be built or generated in volatile memory without having to consider whether the hash table 128 will be irretrievably lost by a system crash or power-cycle.

Further, no extra metadata overhead that is related to indexing is added to the key-value pairs in the storage device 124. For example, in one or more embodiments, the processing circuit 122 does not write any metadata for persistency of the indexing scheme because the processing circuit 122 can recover and rebuild the hash table 128 as described in FIGS. 1A and 1B. In one or more embodiments, the processing circuit 122 only processes key names (e.g., parse key names) from the storage device 124 for building the hash table 128 in the memory cache 126. Therefore, in one or more embodiments, the processing circuit 122 uses the built-in capability of a storage device 124 (e.g., a KV storage device) that includes an iterator 132 (e.g., a KV device iterator) to rebuild the hash table in case of a crash or a reboot without incurring extra overhead in regular object IO path (e.g., PUT path) which may slow down IO performance (e.g., PUT performance). Accordingly, persistency is provided without reducing IO performance.

For example, in accordance with the above, a hash table 128 with approximately 25 million keys with 60-bytes length can be rebuilt within approximately 32 seconds. In one or more embodiments, additional drivers are introduced to provide parallel processing capabilities.

In one or more embodiments, multiple key names may share prefixes, thereby resulting in a hierarchical structure where buckets and/or prefixes may be used to identify more than one key. Further, a host may generate one or more IO requests according to data processing applications or software. The IO requests may include IO operations such as "put", "get", "delete", etc., for object-based storage (e.g., for key-value storage). Each of the IO operations may be handled in a different manner, as will be described below with respect to FIGS. 2A-2C.

Figure 2A:
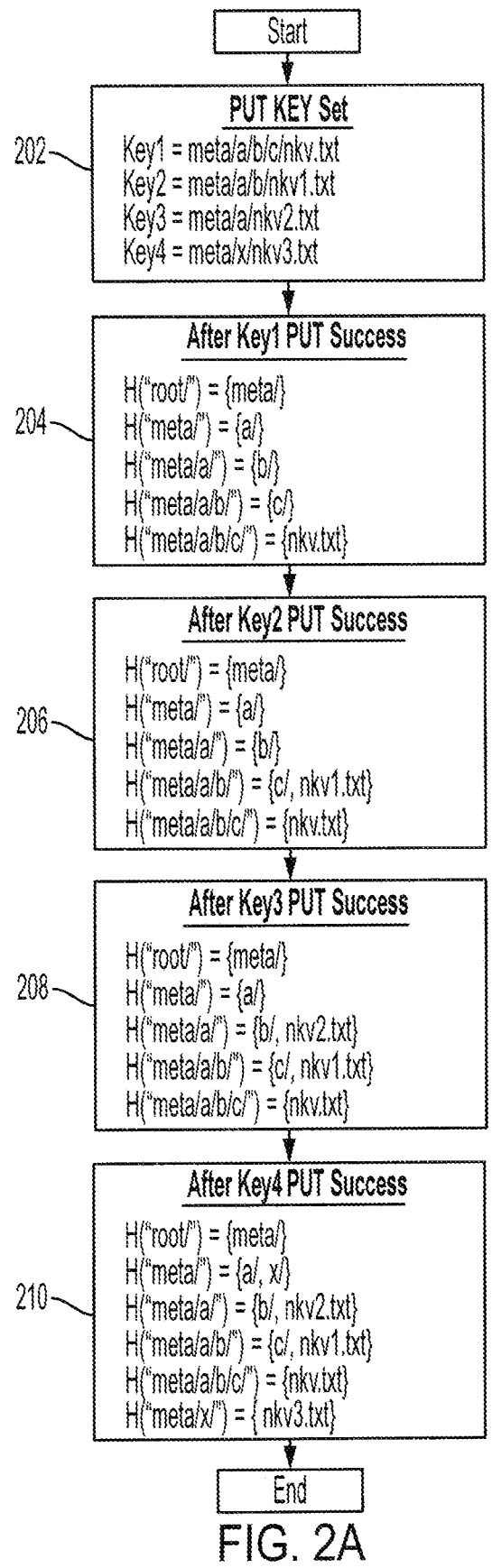
FIG. 2A is a flow chart illustrating a method of performing a "put" operation for a hash table based on an NKV indexing design according to one or more embodiments of the present disclosure.

FIG. 2A is a flow chart illustrating a method of performing a "put" operation for a hash table based on an NKV indexing design according to one or more embodiments of the present disclosure.

Referring to FIG. 2A, a key set (e.g., Key1, Key2, Key3, and Key4) may include four key names (e.g., "meta/a/b/c/nkv.txt", "meta/a/b/nkv1.txt", "meta/a/nkv2.txt", and "metaN/nkv3.txt", which respectively correspond to Key1, Key2, Key3, and Key4). The key set may be used with a "put" operation (202) to consecutively store the four keys in memory. The process of storing the keys may include generating or building a hash table in memory according to the method described with reference to FIG. 1A.

For example, Key1 has the key name "meta/a/b/c/nkv.txt". Based on the delimiters in the key name (e.g., based on the forward slash "/"), four prefixes may be identified. In this case, the prefixes are "meta/", "meta/a/", "meta/a/b/", and "meta/a/b/c/". Each prefix (including the root prefix) may be associated with either a bucket or a key. In this case, after the "put" operation for Key1 is successful (202), the root prefix "root/" is associated with the bucket "meta/", the prefix "meta/" is associated with the bucket "a/", the prefix "meta/a/" is associated with the bucket "b/", the prefix "meta/a/b/" is associated with the bucket "c/", and the prefix "meta/a/b/c/" is associated with the key "nkv.txt". In other words, the hash function of "root/" returns the value "meta/", the hash function of "meta/" returns the value "a/", the hash function of "meta/a/" returns the value "b/", the hash function of "meta/a/b/" returns the value "c/", and the hash function of "meta/a/b/c/" returns the value "nkv.txt".

As discussed with respect to FIG. 1A, in one or more embodiments, redundant entries do not need to be considered for addition to the hash table. Therefore, only portions of the hash table are affected or updated by the addition of Key2.

For example, as shown in the example shown in FIG. 2A, Key2 has the key name "meta/a/b/nkv1.txt". Based on the delimiters in the key name for Key2, three prefixes may be determined. In this case, the prefixes are "meta/", "meta/a/", and "meta/a/b/". Each prefix (including the root prefix) may be associated with either a bucket or a key. However, because Key1 has already generated entries in the hash table, redundant entries may be disregarded.

For example, the root prefix "root/" is already associated with the bucket "meta/", the prefix "meta/" is already associated with the bucket "a/", and the prefix "meta/a/" is already associated with the bucket "b/". Therefore, the only new update to the hash table is the association between the prefix "meta/a/b/" and the key "nkv1.txt". In this case, after the "put" operation for Key2 is successful (204), the root prefix "root/" is associated with the bucket "meta/", the prefix "meta/" is associated with the bucket "a/", the prefix "meta/a/" is associated with the bucket "b/", the prefix "meta/a/b/" is associated with both the bucket "c/" and the key "nkv1.txt", and the prefix "meta/a/b/c/" is associated with the key "nkv.txt". According to the hierarchical data structure of the example shown in FIG. 2A, the key "nkv1.txt" could be considered at a different (e.g., higher) level than the key "nkv.txt".

The "put" operation for Key3 in the example shown in FIG. 2A further illustrates how a single entry in the hash table is affected or updated at a different (e.g., higher) bucket level. In this case, Key3 has the key name "meta/a/nkv2.txt", and, after the "put" operation for Key3 is successful (208), the hash function of "meta/a/" now returns the bucket "b/" and the key "nkv2.txt", as shown in FIG. 2A.

The "put" operation for Key4 in the example shown in FIG. 2A illustrates how a prefix may be associated with more than one bucket. In this case, after the "put" operation for Key4 is successful (210), the hash function of "meta/" returns both bucket "a/" and bucket "x/", and the hash function of "meta/x/" returns the key "nkv.3.txt".

Accordingly, an NKV indexing design may be built by a series of "put" commands to store a key set, as described with respect to FIG. 2A. The keys and buckets of the NKV indexing design may be viewed as part of a hierarchical data structure where the key and buckets are at respective levels that are set by the key name of each of the keys. Further, non-hierarchical keys may be stored under the root prefix following the method described in FIG. 1A.

It should be noted that, although it is described that specific naming conventions are used for the prefixes, buckets, keys, delimiters, and key names, other suitable variations to the naming convention could be applied consistent with the NKV indexing design according to one or more embodiments of the present disclosure.

Figure 2B:
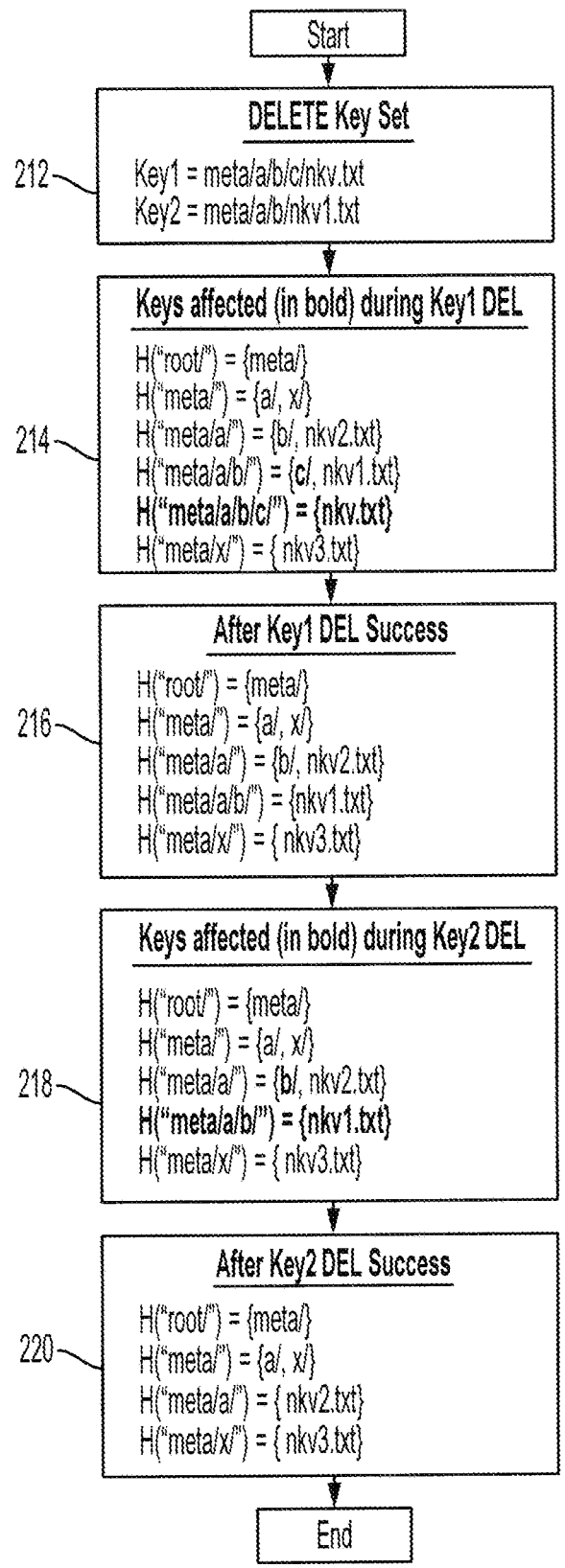
FIG. 2B is a flow chart illustrating a method of performing a "delete" operation for the hash table of FIG. 2A according to one or more embodiments of the present disclosure.

FIG. 2B is a flow chart illustrating a method of performing a "delete" operation for the hash table of FIG. 2A according to one or more embodiments of the present disclosure.

Referring to FIG. 2B, a key set (e.g., Key1, Key2) may include two key names (e.g., "meta/a/b/c/nkv.txt", "meta/a/b/nkv1.txt", which respectively correspond to Key1 and Key2), the two key names being marked for deletion. The key set may be used with a "delete" operation (212) to consecutively delete the two keys of the key set in memory.

The "delete" operation may affect only associations between a prefix and a bucket or key that exist solely because of the key marked for deletion. For example, Key1 has the key name "meta/a/b/c/nkv.txt" and is marked for deletion in the example shown in FIG. 2B. Before deletion of Key1, the prefix "root/" is associated with the bucket "meta/", the prefix "meta/" is associated with both the bucket "a/" and the bucket "x/", the prefix "meta/a/" is associated with both the bucket "b/" and the key "nkv2.txt", the prefix "meta/a/b/" is associated with both the bucket "c/" and the key "nkv1.txt", the prefix "meta/a/b/c/" is associated with the key "nkv.txt", and the prefix "meta/x/" is associated with the key "nkv3.txt".

In the example shown in FIG. 2B, the hash function of "meta/a/b/c/" returns the key "nkv.txt", and the hash function of "meta/a/b/" returns the bucket "c/", due to the key name for Key1. Therefore, deletion of Key1 only affects or removes the association between the prefix "meta/a/b/c/" and the value "nkv.txt" and between the prefix "meta/a/b/" and the value "c/" (214). In other words, the key "nkv.txt" is deleted by the "delete" operation, and the bucket "c/" thereafter represents an empty bucket (e.g., represents a bucket not containing any keys due to the key "nkv.txt" being deleted), thereby resulting in the empty bucket, bucket "c/", being deleted. The other associations in the hash table are not affected because they depend on other key names (e.g., key names that are not being deleted). In other words, the other buckets (e.g., "meta/", "a/", "x/", and "b/") contain one or more keys at one or more lower levels of the hierarchical data structure.

Therefore, after the "delete" operation for Key1 is successful (216), the root prefix "root/" is associated with the bucket "meta/", the prefix "meta/" is associated with both the bucket "a/" and the bucket "x/", the prefix "meta/a/" is associated with both the bucket "b/" and the key "nkv2.txt", the prefix "meta/a/b/" is associated with the key "nkv1.txt", and the prefix "meta/x/" is associated with the key "nkv3.txt".

In one or more embodiments, Key2 having the key name "meta/a/b/nkv1.txt" may be marked for deletion. In this case, as shown in FIG. 2B, deletion of Key2 only affects or removes the association between the prefix "meta/a/b/" and the value "nkv1.txt" and between the prefix "meta/a/" and the value "b/" (218). In other words, the key "nkv1.txt" is deleted by the "delete" operation, and the bucket "b/" represents an empty bucket (e.g., a bucket not containing any keys, because the key "nkv1.txt" was deleted), thereby resulting in the bucket "b/" being deleted.

Therefore, after the "delete" operation for Key2 is successful (220), the root prefix "root/" is associated with the bucket "meta/", the prefix "meta/" is associated with both the bucket "a/" and the bucket "x/", the prefix "meta/a/" is associated with the key "nkv2.txt", and the prefix "meta/x/" is associated with the key "nkv3.txt".

Although specific keys are deleted in the example shown in FIG. 2B, any key stored in the NKV indexing design may be deleted according to the method described with respect to FIG. 2B in one or more embodiments of the NKV indexing design.

Figure 2C:
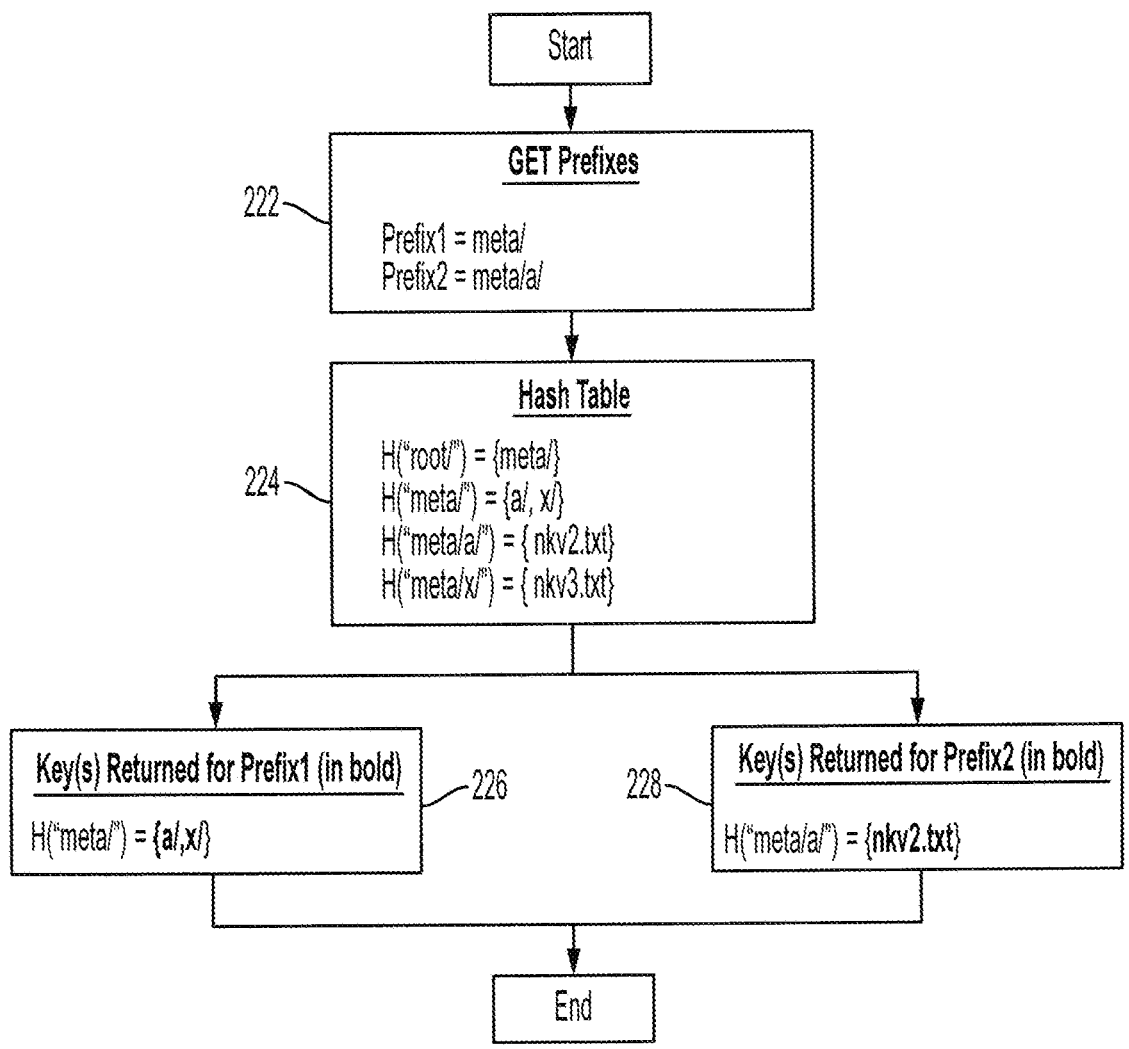
FIG. 2C is a flow chart illustrating a method of performing a "get" operation for the hash table of FIG. 2B according to one or more embodiments of the present disclosure.

FIG. 2C is a flow chart illustrating a method of performing a "get" operation for the hash table of FIG. 2B according to one or more embodiments of the present disclosure.

Referring to FIG. 2C, a "get" operation may be used to list keys and/or buckets. For example, a "get" operation (222) may be used on the prefixes "meta/" and "meta/a/" for the hash table 224 of FIG. 2B. In this case, the hash function of the prefix "meta/" may return (226) both the bucket "a/" and the bucket "x/", and the hash function of the prefix "meta/a/" may return (228) the key "nkv2.txt". Based on the NKV indexing design, a "get" operation using a prefix avoids a search through irrelevant keys and/or buckets (i.e., buckets and/or keys associated with different prefixes). Because the search is non-recursive, the search might only list keys at the current level and might not recursively go within the next bucket to list keys. Therefore, a bucket (as opposed to an entire listing of keys within the bucket) may be returned or listed, which thereby improves performance by avoiding performance loss that would be related to unnecessarily searching deeper levels of keys. For example, if there are key names such as "meta/a/b/c.txt" and "meta/a/d/x.txt" and a user requests a search with the prefix "meta/a/", then the search will list the part of the keys at that level only, in this example case, bucket "b/" and bucket "d/". The search might not go under bucket "b/" or bucket "d/" to list the keys "c.txt" and "x.txt".

In one or more embodiments, the listing performance is represented by O(N) (e.g., linear or constant time) where N is the number of keys and buckets associated with a prefix at a single level. For example, the number of keys and buckets in (226) and (228) of FIG. 2C associated with Prefix1 and Prefix2 are 2 and 1 respectively. Therefore, there is provided the flexibility to control the listing performance of keys associated with a prefix because the listing is based on the prefix, as opposed to the entire key set. Therefore, the hash table including one or more keys and/or buckets sorts the one or more keys according to one or more embodiments of the NKV indexing design, which improves IO performance.

In one or more embodiments, creating the hash table in memory allows for fast access to the keys. However, as an increasing number of prefixes are generated, storing additional keys may require more memory. In one or more embodiments, available memory may be limited. Therefore, the keys may be relatively small (e.g., less than 500 bytes) to more easily accommodate large numbers of keys in memory.

Figure 3:
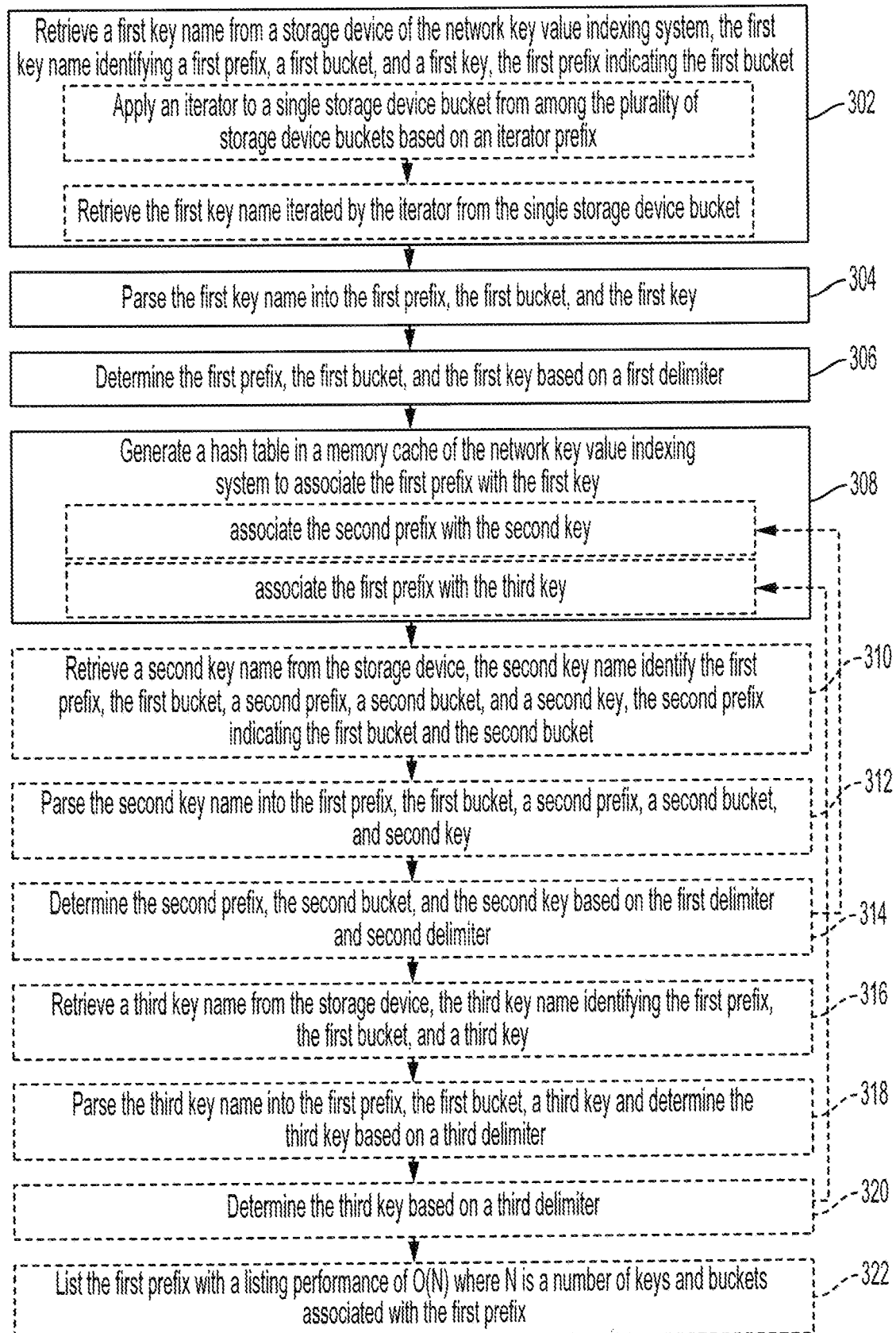
FIG. 3 is a flow chart illustrating a method of indexing in a network key value indexing system according to one or more embodiments of the present disclosure.

FIG. 3 is a flow chart illustrating a method of indexing in a network key value indexing system according to one or more embodiments of the present disclosure.

Referring to FIG. 3, a method of indexing in a network key value indexing system may include retrieving a first key name from a storage device of the network key value indexing system (302). The first key name may identify a first prefix, a first bucket, and a first key. The first prefix may indicate the first bucket.

In one or more embodiments, the storage device includes a plurality of storage device buckets. Retrieving the first key name may further include applying an iterator to a single storage device bucket from among the plurality of storage device buckets based on an iterator prefix. Retrieving the first key name may further include retrieving the first key name iterated by the iterator from the single storage device bucket.

The method of indexing in a network key value indexing system may further include parsing the first key name into the first prefix, the first bucket, and the first key (304).

The method of indexing in a network key value indexing system may further include determining the first prefix, the first bucket, and the first key based on a first delimiter (306).

The method of indexing in a network key value indexing system may further include generating a hash table in a memory cache of the network key value indexing system to associate the first prefix with the first key (308).

In one or more embodiments, the hash table generated in the memory cache may include additional entries from associating the second prefix with the second key in response to retrieving, parsing, and determining acts (310, 312, and 314) and/or from associating the first prefix with a third key in response to retrieving, parsing, and determining acts (316, 318, and 320), as discussed in more detail below.

In one or more embodiments, the method of indexing in a network key value indexing system may further include retrieving a second key name from the storage device (310). The second key name may identify the first prefix, the first bucket, a second prefix, a second bucket, and a second key. The second prefix may indicate the first bucket and the second bucket.

The method of indexing in a network key value indexing system may further include parsing the second key name into the first prefix, the first bucket, a second prefix, a second bucket, and a second key (312).

The method of indexing in a network key value indexing system may further include determining the second prefix, the second bucket, and the second key based on the first delimiter and a second delimiter (314).

The method of indexing in a network key value indexing system may further include retrieving a third key name from the storage device (316). The third key name identifying the first prefix, the first bucket, and a third key.

The method of indexing in a network key value indexing system may further include parsing the third key name into the first prefix, the first bucket, and a third key (318).

The method of indexing in a network key value indexing system may further include determining the third key based on a third delimiter (320).

The method of indexing in a network key value indexing system may include listing the first prefix with a listing performance of O(N) where N is a number of keys and buckets associated with the first prefix (322).

In one or more embodiments, retrieving (e.g., act 302), parsing (e.g., act 304), determining (e.g., act 306), and generating (e.g., act 308) may be repeated during startup of a network key value indexing system in response to a system crash or power-cycle.

Accordingly, as disclosed herein, embodiments of the present disclosure improve performance of key listing by applying an NKV indexing design to create a hierarchical data structure in volatile memory that is crash tolerant, and that avoids large metadata overhead on storage due to the demands of a persistent NKV indexing design (e.g., a persistent NKV indexing design may require additional information in metadata that would impact IO performance).

While the present disclosure has been particularly shown and described with reference to some example embodiments thereof, it will be understood by those of ordinary skill in the art that various changes in form and details may be made therein without departing from the spirit and scope of the present disclosure as set forth in the following claims and their equivalents.

What is claimed is:

1. A method of indexing, the method comprising:
retrieving, by a network key value indexing system, a first key name from a storage device of the network key value indexing system, the first key name comprising a hierarchical data structure identifying a first prefix, a first bucket, and a first key, the first prefix indicating the first bucket;
parsing, by a processing circuit of the network key value indexing system, the first key name into the first prefix, the first bucket, and the first key;
determining, by the processing circuit, the first prefix, the first bucket, and the first key based on a first delimiter of the hierarchical data structure; and
generating, by the processing circuit, a hash table in a memory cache of the network key value indexing system, based on the hierarchical data structure, to associate the first prefix with the first key,
wherein the network key value indexing system is configured to recreate the hash table in the memory cache, based on the first key name, in response to a system crash or power-cycle.

2. The method of claim 1, the method further comprising:
retrieving, by the network key value indexing system, a second key name from the storage device, the second key name comprising a hierarchical data structure identifying the first prefix, the first bucket, a second prefix, a second bucket, and a second key, the second prefix indicating the first bucket and the second bucket;
parsing, by the processing circuit, the second key name into the first prefix, the first bucket, a second prefix, a second bucket, and a second key; and
determining, by the processing circuit, the second prefix, the second bucket, and the second key based on the first delimiter and a second delimiter,
wherein generating the hash table in the memory cache comprises associating the second prefix with the second key.

3. The method of claim 1, the method further comprising:
retrieving, by the network key value indexing system, a third key name from the storage device, the third key name comprising a hierarchical data structure identifying the first prefix, the first bucket, and a third key;
parsing, by the processing circuit, the third key name into the first prefix, the first bucket, and the third key; and
determining, by the processing circuit, the third key based on a third delimiter, wherein generating the hash table in the memory cache comprises associating the first prefix with the third key.

4. The method of claim 1, wherein the memory cache is volatile memory.

5. The method of claim 1, the method further comprising searching, by the network key value indexing system, for keys and buckets associated with the first prefix, wherein the searching for the keys and the buckets associated with the first prefix is associated with a performance of O(N) where N is a number of the keys and the buckets associated with the first prefix.

6. The method of claim 1, the method further comprising repeating the retrieving, the parsing, the determining, and the generating during a startup of the network key value indexing system in response to a system crash or power-cycle.

7. The method of claim 1, wherein the storage device comprises one or more storage device buckets, and
wherein the retrieving the first key name from the storage device comprises:
applying an iterator to a single storage device bucket from among the one or more storage device buckets based on an iterator prefix; and
retrieving the first key name iterated by the iterator from the single storage device bucket.

8. A non-transitory computer readable medium implemented on a system for indexing, the non-transitory computer readable medium having computer code that implements a method of indexing, the method comprising:
retrieving, by a processing circuit of a network key value indexing system, a first key name comprising a hierarchical data structure from a storage device;
parsing, by the processing circuit, the first key name comprising a first prefix, a first bucket, and a first key, the first prefix indicating the first bucket;
determining, by the processing circuit, the first prefix, the first bucket, and the first key based on a first delimiter of the hierarchical data structure; and
generating, by the processing circuit, a hash table in a memory cache, based on the hierarchical data structure, by associating the first prefix with the first key,
wherein the processing circuit is configured to recreate the hash table in the memory cache, based on the first key name, in response to a system crash or power-cycle.

9. The non-transitory computer readable medium of claim 8, wherein the computer code further implements the method of indexing by:
retrieving, by the processing circuit, a second key name from the storage device, the second key name comprising a hierarchical data structure identifying the first prefix, the first bucket, a second prefix, a second bucket, and a second key, the second prefix indicating the first bucket and the second bucket;
parsing, by the processing circuit, the second key name into the first prefix, the first bucket, a second prefix, a second bucket, and a second key; and
determining, by the processing circuit, the second prefix, the second bucket, and the second key based on the first delimiter and a second delimiter,
wherein generating the hash table in the memory cache comprises associating the second prefix with the second key.

10. The non-transitory computer readable medium of claim 8, wherein the computer code further implements the method of indexing by:
retrieving, by the processing circuit, a third key name from the storage device, the third key name comprising a hierarchical data structure identifying the first prefix, the first bucket, and a third key;
parsing, by the processing circuit, the third key name into the first prefix, the first bucket, and the third key; and
determining, by the processing circuit, the third key based on a third delimiter,
wherein generating the hash table in the memory cache comprises associating the first prefix with the third key.

11. The non-transitory computer readable medium of claim 8, wherein the memory cache is volatile memory.

12. The non-transitory computer readable medium of claim 8, wherein the computer code further implements the method of indexing by searching, by the processing circuit, for keys and buckets associated with the first prefix, wherein the searching for the keys and the buckets associated with the first prefix is associated with a performance of O(N) where N is a number of the keys and the buckets associated with the first prefix.

13. The non-transitory computer readable medium of claim 8, wherein the computer code further implements the method of indexing by repeating the retrieving, the parsing, the determining, and the generating in response to a system crash or power-cycle.

14. The non-transitory computer readable medium of claim 8, wherein the storage device comprises a one or more storage device buckets, and
wherein the computer code implements the retrieving the first key name from the storage device by:
applying an iterator to a single storage device bucket from among the one or more storage device buckets based on an iterator prefix; and
retrieving the first key name iterated by the iterator from the single storage device bucket.

15. A system for indexing, the system comprising a storage device, a processing circuit, and a memory cache, wherein the processing circuit is configured to:
retrieve a first key name comprising a hierarchical data structure from the storage device;
parse the first key name comprising a first prefix, a first bucket, and a first key, the first prefix indicating the first bucket;
determine the first prefix, the first bucket, and the first key based on a first delimiter of the hierarchical data structure; and
generate a hash table in the memory cache, based on the hierarchical data structure, by associating the first prefix with the first key,
wherein the processing circuit is configured to recreate the hash table in the memory cache, based on the first key name, in response to a system crash or power-cycle.

16. The system of claim 15, wherein the processing circuit is further configured to:
retrieve a second key name from the storage device, the second key name comprising a hierarchical data structure identifying the first prefix, the first bucket, a second prefix, a second bucket, and a second key, the second prefix indicating the first bucket and the second bucket;
parse the second key name into the first prefix, the first bucket, a second prefix, a second bucket, and a second key; and
determine the second prefix, the second bucket, and the second key based on the first delimiter and a second delimiter,
wherein the processing circuit is configured to generate the hash table in the memory cache by associating the second prefix with the second key.

17. The system of claim 15, wherein the processing circuit is further configured to:
   retrieve a third key name from the storage device, the third key name comprising a hierarchical data structure identifying the first prefix, the first bucket, and a third key;
   parse the third key name into the first prefix, the first bucket, and the third key; and
   determine the third key based on a third delimiter,
   wherein the processing circuit is configured to generate the hash table in the memory cache by associating the first prefix with the third key.

18. The system of claim 15, wherein the memory cache is volatile memory.

19. The system of claim 15, wherein the processing circuit is further configured to search for keys and buckets associated with the first prefix, wherein the searching for the keys and the buckets associated with the first prefix is associated with a performance of O(N) where N is a number of the keys and the buckets associated with the first prefix.

20. The system of claim 15, wherein the processing circuit is further configured to repeat retrieving the first key name, parsing the first key name, determining the first prefix, the first bucket, and the first key, and generating the hash table in response to a system crash or power-cycle.

* * * * *